United States Patent
Kipers

(10) Patent No.: US 9,302,209 B2
(45) Date of Patent: Apr. 5, 2016

(54) FILTER MEDIUM FOR METAL-WORKING LIQUIDS

(75) Inventor: Kenneth C. Kipers, Dallas, TX (US)

(73) Assignee: KAGEHT LLC, Dallas, TX (US)

( * ) Notice: Subject to any disclaimer, the term of this patent is extended or adjusted under 35 U.S.C. 154(b) by 646 days.

(21) Appl. No.: 12/751,726

(22) Filed: Mar. 31, 2010

(65) Prior Publication Data

US 2010/0252509 A1    Oct. 7, 2010

Related U.S. Application Data

(60) Provisional application No. 61/165,625, filed on Apr. 1, 2009.

(51) Int. Cl.
| | | |
|---|---|---|
| B01D 39/00 | (2006.01) | |
| B01D 17/05 | (2006.01) | |
| B01D 39/18 | (2006.01) | |
| B01D 39/16 | (2006.01) | |
| B01D 39/20 | (2006.01) | |

(52) U.S. Cl.
CPC ............ *B01D 39/18* (2013.01); *B01D 39/1623* (2013.01); *B01D 39/2068* (2013.01); *B01D 2239/0283* (2013.01); *B01D 2239/0464* (2013.01)

(58) Field of Classification Search
None
See application file for complete search history.

(56) References Cited

U.S. PATENT DOCUMENTS

| 2,366,190 | A | * | 1/1945 | Hurn | 210/663 |
| 2,435,707 | A | * | 2/1948 | Bray et al. | 516/136 |
| 3,232,865 | A | * | 2/1966 | Quinn et al. | 210/610 |
| 3,253,715 | A | * | 5/1966 | Painter et al. | 210/504 |
| 3,489,676 | A | * | 1/1970 | Geyer et al. | 208/179 |
| 3,523,074 | A | * | 8/1970 | Geyer et al. | 208/179 |
| 3,558,478 | A | * | 1/1971 | Geyer et al. | 208/179 |
| 3,715,037 | A | * | 2/1973 | Hu et al. | 210/501 |
| 4,357,243 | A | | 11/1982 | Dobrez et al. | |
| 4,519,899 | A | | 5/1985 | Oertle et al. | |
| 5,122,281 | A | | 6/1992 | Schneider et al. | |
| 5,154,828 | A | | 10/1992 | Schneider et al. | |
| 5,378,670 | A | | 1/1995 | Kumar | |
| 5,972,230 | A | | 10/1999 | Ely | |
| 6,059,976 | A | | 5/2000 | Kovolick et al. | |
| 6,191,077 | B1 | | 2/2001 | Baumgartner et al. | |
| 6,221,835 | B1 | | 4/2001 | Hu et al. | |
| 6,358,423 | B1 | | 3/2002 | Barten et al. | |
| 7,338,605 | B2 | | 3/2008 | Snell et al. | |
| 7,341,668 | B2 | | 3/2008 | Snell et al. | |
| 2010/0252509 | A1 | * | 10/2010 | Kipers | 210/805 |

OTHER PUBLICATIONS

Diatomaceous Earth (Kieselguhr/Kieselgur) downloaded from Wikipedia on Aug. 23, 2012; 9 pages.*
IPER of PCT/US2010/029612 dated Oct. 29, 2010, 4 pages.*

* cited by examiner

*Primary Examiner* — Robert James Popovics
(74) *Attorney, Agent, or Firm* — Gardere Wynne Sewell LLP

(57) ABSTRACT

The technology presents filter media and methods of recycling metal-working liquids by removing metal fines and other contaminants using the filter media. An exemplary method includes a series of steps. These steps include filtering a contaminated metal-working liquid that has metal fines through an exemplary filter medium that is comprised of a carrier and a chemical agent. The carrier is impregnated with a chemical agent selected from the group consisting of phosphoric acid, polyphosphoric acid, phosphorous acid, phosphorous pentoxide, and mixtures or derivatives of these. Further, the exemplary method includes collecting a filtrate substantially free of ashable residue; and reusing the filtrate as a metal-working liquid.

19 Claims, No Drawings

FILTER MEDIUM FOR METAL-WORKING LIQUIDS

BACKGROUND

1. Technical Field

The technology relates to a filter medium and methods of use for cleaning metal-working liquids, and more particularly to metal-working liquids that are used in the manufacture of aluminum products such as sheets, foils and containers, such as beverage cans.

2. Description of the Related Art

It is commonplace to continuously circulate a metal-working liquid (often referred to as a "coolant") during metal forming processes to remove heat generated and to filter it continuously to remove contaminants from the metal-working process. Over a period of time, the metal-working liquid will become increasingly contaminated with metal fines, tramp oil and other contaminants, some of which may be soaps that are formed from coolant chemical agent reaction with metal fines. At some point, the level of contamination may have a detrimental effect on the process, the equipment and the qualities of the metal objects being formed. At this stage, the metal-working liquid must be discarded and replaced, or it may be treated to remove the contaminants and re-used.

In order to maintain a continuously operating metal forming process, it is desirable to continuously treat the metal-working liquid for contaminants rather than to replace the liquid at intervals with batches of new or recycled metal-working liquid. Batch-wise replacement has the disadvantage that contaminant levels are low at the outset and increase over time until the liquid is replaced with a fresh batch. Accordingly, contaminant levels fluctuate from a low level, when the metal-working liquid is fresh, to a higher level at the point of liquid replacement. This cycling of contaminant level may have a deleterious effect on quality of the formed metal objects.

SUMMARY

An exemplary method of recycling metal-working liquids by removing metal fines and other contaminants includes a series of steps. These steps include filtering a contaminated metal-working liquid that has metal fines through a filter medium that has a carrier and a chemical agent. The carrier is impregnated with a chemical agent selected from the group consisting of phosphoric acid, polyphosphoric acid, phosphorous acid, phosphorous pentoxide, and mixtures or derivatives of these. Further, the method includes collecting a filtrate substantially free of ashable residue and reusing the filtrate as a metal-working liquid.

Another exemplary embodiment provides a filter medium for removing metal fines and other contaminants from a metal-working liquid comprising a mineral oil. The filter medium consists essentially of (1) a carrier selected from cellulosic material, clay, diatomaceous earth, and kieselguhr; and (2) a chemical agent impregnating the carrier, the chemical agent selected from phosphoric acid, phosphorous acid, polyphosphoric acid, phosphorous pentoxide, and mixtures and derivatives of these. The chemical agent sequesters metal fines from metal-working liquids filtered through the filter medium.

A yet further exemplary embodiment provides a filter medium for removing metal fines and other contaminants from a metal-working liquid comprising a mineral oil. The filter medium consists essentially of a carrier selected from a material that is commingled with a chemical agent. The chemical agent is impregnated into or bonded with the carrier. The chemical agent is selected from phosphoric acid, phosphorous acid, polyphosphoric acid, phosphorous pentoxide, and mixtures and derivatives of these. The chemical agent sequesters metal fines from metal-working liquids filtered through the filter medium to produce a filtrate substantially free of ashable contaminants.

DETAILED DESCRIPTION

Metal-working liquids vary in composition depending upon the service they are expected to perform. In general, metal-working fluids may be of mineral oil, or an emulsion of a mineral oil and water. Some emulsions may be an emulsion of oil-in-water and in others an emulsion of water-in-oil. Typically, additives are added to enhance performance or for other purposes. Moreover, in some cases, when the metal-working liquid is mineral oil, water may constitute a contaminant.

Metal-working liquid used in rolling mills that reduce aluminum to aluminum foil or sheet includes a range of additives. These additives may include, for example, aliphatic acids, esters of aliphatic alcohols and acids, aliphatic alcohols, esters of polyhydric alcohols, esters of di- and tri-acids, and natural oils, such as palm and coconut oils.

During use in an aluminum metal rolling process, the metal-working fluid gradually becomes contaminated with metal fines and soaps formed from reaction of additives with fresh metal fines, unless these are continuously removed. The soaps and metal fines cling to metal surfaces and cause defects as the metal passes through successive reduction stages. In addition, some metal fines may oxidize to form hard oxide particles that may gouge and damage the metal surfaces being formed in the reduction stages.

An exemplary embodiment presents a filter medium suitable for use as a medium in a continuous filtration process to substantially remove contaminants from metal-working liquid and other process fluids. The contaminants substantially removed include, but are not limited to, metal fines, soaps and oxides. The resultant filtrate is substantially free of contaminants, as measured by ash residue from a filtrate sample treated at 800° C. after 60 minutes. In an exemplary embodiment, the ash residue is less than about 0.0001 wt. % and is typically in the range from about 0.0000 wt. % to about 0.002 wt. %, and in another exemplary embodiment from about 0.0000 wt. % to about 0.0005 wt. %. In another exemplary embodiment, the filter removes at least about 99.99 wt. % of metal fines from the metal-working liquid and generally removes from about 99.99 to about 99.999 wt. % of the metal fines from the metal-working liquid.

An exemplary filter medium includes a carrier and a chemical agent associated with the carrier. An exemplary carrier may be selected from a range of materials that have a suitable size, flow characteristics that do not cause a large pressure drop, and that are inert in the metal-working liquid. In the event that the metal being worked will be used to contain food or beverages, it should also be non-toxic. Further, the carrier should be capable of association with the chemical agent such that the chemical agent is not readily eluted or separated from the carrier by water or aqueous components of a metal-working liquid. The mechanism of association may be by chemical bond of any type, or by strong physical association.

An exemplary embodiment of a chemical agent includes those chemicals that are acidic and contain phosphorus. In the event that the metal being worked is for use in containers for food or beverages, or may be used in contact with food, it should also be non-toxic. Further, the chemical agent should desirably be so strongly associated with the selected carrier that it is substantially not removable or eluted from the carrier by minor amounts of water or aqueous contaminants in those metal-working liquids that include substantially only mineral oils. Exemplary embodiments of the chemical agent include polyphosphorous acid, phosphorous pentoxide, phosphoric acid, and phosphorous acid.

Non-limiting and exemplary embodiments of the carrier include cellulosic fibers, such as wood fiber, paper pulp, cotton fiber, as well as synthetic fibers, such as those prepared from organic polymers (often referred to as "plastic fibers"), such as polyethylene, polypropylene, polyester, and the like. In addition, natural waste products, such as rice hulls, coffee grounds, and the like, and charcoal or ash derived from rice hulls and like materials are also useful.

In the case of synthetic carriers, the chemical agent may be added to the carrier during its formation, for example during or before extrusion into fibrous form, or it may be admixed with the fibers after formation. In the case of paper pulp carriers that may be formed into filter sheets, the chemical agent may also be added to the pulp prior to paper filter sheet formation to ensure uniform impregnation with the chemical agent.

In the case of the cellulosic carriers, such as wood pulp, these are supplied as low bulk density products that may be admixed with the chemical agent. For example, wood fiber (white in color) may be commingled with anhydrous phosphorous pentoxide in a ribbon blender equipped with a mechanical chopper. The processes of mixing while chopping for a period of about 30 minutes generates mechanical heat up to about 100° C. The resultant filter medium is a light brown or grey in color.

In general, the filter medium includes from about 10 to about 70 wt. % of the chemical agent, depending upon the bulk density of the carrier relative to the chemical agent. More typically, the filter medium contains from about 20 to about 50 wt. % of the chemical agent, depending upon relative bulk densities.

In an exemplary embodiment, the metal-working liquid may be pre-filtered or centrifuged to remove larger particulates and contaminants. The metal-working liquid containing metal fines, such as aluminum fines, soaps and any other contaminants, is then filtered through the filter medium to remove metal fines and to react with and de-saponify the soaps. The phosphorus based acid of the chemical agent removes the metal that reacted with the aliphatic acids to form soaps and thereby restores these to prior acid forms. Further, the mild phosphorous-based acid of the chemical agent reacts with the metal fines and thereby removes the physical bulk of the fines that have deleterious effects on the process.

Based on the foregoing, it is apparent that there should be sufficient contact between the contaminants and the chemical agent to permit complete or substantially complete removal of contaminants. Accordingly, the flow path of the metal-working liquid should be sufficiently long to permit such contact and this may be achieved by the judicious selection of filter medium bed thickness on the filtration equipment support.

Because the chemical agent will be gradually exhausted or "used up" in chemical reactions with metal fines, soaps and other contaminants, the filter medium should be monitored and periodically replaced. Monitoring may be effected by testing periodic samples of the filtrate to determine when the contaminants "break through" the filter bed or by monitoring the back pressure on the filter and replacing the bed with fresh filter medium when required, or by routinely replacing the filter medium in the filter bed, based on operating experience.

EXAMPLES

Experiment 1

Polyphosphoric acid from Spectrum Chemicals (4.36 g.) was added to wood pulp obtained from Gusmer Enterprises (6.00 g.). This material (Product 1) was mixed in a mortar and pestle and then placed in an oven at 120° C. for 30 minutes. Product 1 was cooled in a closed container and then remixed in a mortar and pestle.

Used aluminum cold rolling mineral oil was utilized for the evaluation of Product 1. The rolling oil was composed of Norpar 15™, a blend of esters, aluminum fines, and other materials, obtainable from ExxonMobil Chemicals. Product 1 (0.50 g.) was added to the used rolling oil (25 ml) and the resulting solution stirred with a magnetic stirrer at room temperature (22° C.) for 60 minutes. The solution was gravity filtered. A portion of the filtrate (11.54 g.) was ashed for 60 minutes at 800° C. Likewise, a control was run with untreated wood pulp. In this case, wood pulp (0.51 g) was added to the rolling oil (25 ml) and treated in the manner of the first experiment. The results are as follows:

| Filter aid | Filtrate Ash, % |
| --- | --- |
| Product 1 | 0.0004 |
| Control | 0.0342 |

From the foregoing results it is readily apparent that Product 1, an exemplary embodiment, provides a superior filtrate that has a much lower percentage of residual ashable contaminants.

Experiment 2

Polyphosphoric acid from Spectrum Chemicals (1.2637 g.) was added to diatomaceous earth (5.9304 gm) from Eagle Picher. This material (Product 2) was mixed in a mortar and pestle and then placed in an oven at 120° C. for 30 minutes. Product 2 was cooled in a closed container and then remixed in a mortar and pestle.

Used aluminum cold rolling mineral oil was utilized for the evaluation of Product 2. The rolling oil was composed of Norpar 15™, a blend of esters, aluminum fines, and other materials. Product 2 (2.12 g.) was added to the used rolling oil (25 ml) and the resulting solution stirred with a magnetic stirrer at room temperature (22° C.) for 60 minutes. The solution was gravity filtered. A portion of the filtrate (11.82 g.) was ashed ultimately for 60 minutes at 800° C. Likewise, a control was run with untreated diatomaceous earth. In this case, diatomaceous earth (2.10 g.) was added to the rolling oil (25 ml) and treated in the manner of the first experiment. The results for the two experiments are as follows:

| Filter aid | Filtrate Ash, % |
| --- | --- |
| Product 2 | 0.0000 |
| Control | 0.0176 |

From the foregoing results it is readily apparent that Product 2, an exemplary embodiment, provides a superior filtrate that has a much lower percentage of residual ashable contaminants.

While several exemplary embodiments have been presented in the foregoing detailed description of the technology and in the foregoing non-limiting examples, it should be appreciated that a multiplicity of variations exists. It should also be appreciated that the exemplary embodiment or exemplary embodiments are only examples, and are not intended to limit the scope or applicability of the technology in any way. Rather, the foregoing detailed description will provide those skilled in the art with a convenient roadmap for implementing an exemplary embodiment, it being understood that various changes may be made in the specific components described in an exemplary embodiment without departing from the scope of the invention, as set forth in the appended claims and their legal equivalents.

The invention claimed is:

1. A filter medium for removing metal fines and soap from a working liquid used during a metal forming process, the working liquid further comprising a mineral oil and additives for the metal forming process, the filter medium consisting essentially of:
   a carrier that is inert in the working liquid, is non-toxic, and selected from the group consisting of cellulosic material, synthetic fibers, clay, diatomaceous earth and kieselguhr; and
   a phosphorous based acid selected from the group consisting of phosphoric acid, polyphosphoric acid, phosphorous pentoxide, and mixtures and/or derivatives thereof,
   wherein the phosphorous based acid is chemically bonded to the carrier in a manner that prevents elution or separation of the phosphorous based acid from the carrier when in the presence of water or aqueous contaminants present in the working liquid,
   wherein an amount of the phosphorous based acid in the filter medium is from about 10 wt. % to about 70 wt. %,
   wherein the metal working liquid containing the metal fines and soaps is filtered through the filter medium to remove the metal fines and soaps and to react with and de-saponify the soaps, the phosphorous based acid being gradually exhausted or used up in chemical reactions with the metal fines and soaps.

2. The filter medium of claim 1, wherein the metal fines are aluminum fines.

3. The filter medium of claim 1, wherein the phosphorous based acid is in an amount from about 20 wt. % to about 50 wt. %.

4. The filter medium of claim 1, wherein the cellulosic material is selected from wood fibers, wood pulp, paper pulp, cotton fiber, and fibrous natural waste products.

5. The filter medium of claim 1, wherein the cellulosic material is wood pulp.

6. The filter medium of claim 1, wherein the filter medium sequesters metal fines from the working liquid.

7. The filter medium of claim 1, wherein the filter medium sequesters fresh metal fines from the working liquid.

8. The filter medium of claim 1, wherein the phosphorous based acid is anhydrous.

9. The filter medium of claim 1, wherein the filter medium is a filter medium bed and is part of a filtration system for sequestering the metal fines from the working liquid.

10. The filter medium of claim 1, wherein the carrier is wood fibers.

11. The filter medium of claim 1, wherein the phosphorous based acid is phosphoric acid.

12. The filter medium of claim 1, wherein the phosphorous based acid is polyphosphoric acid.

13. The filter medium of claim 1, wherein the phosphorous based acid is phosphorous pentoxide.

14. The filter medium of claim 1, wherein the carrier is the cellulosic material.

15. The filter medium of claim 14, wherein the cellulosic material is paper pulp.

16. The filter medium of claim 1, wherein the carrier is the synthetic fibers.

17. The filter medium of claim 15, wherein the synthetic fibers are plastic fibers.

18. The filter medium of claim 1, wherein the carrier is the diatomaceous earth.

19. The filter medium of claim 1, wherein the carrier is the kieselguhr.

* * * * *